Jan. 9, 1951 W. C. CARRIKER 2,537,442
AIR-COOLED VEHICLE WHEEL
Filed Dec. 20, 1948 2 Sheets-Sheet 1
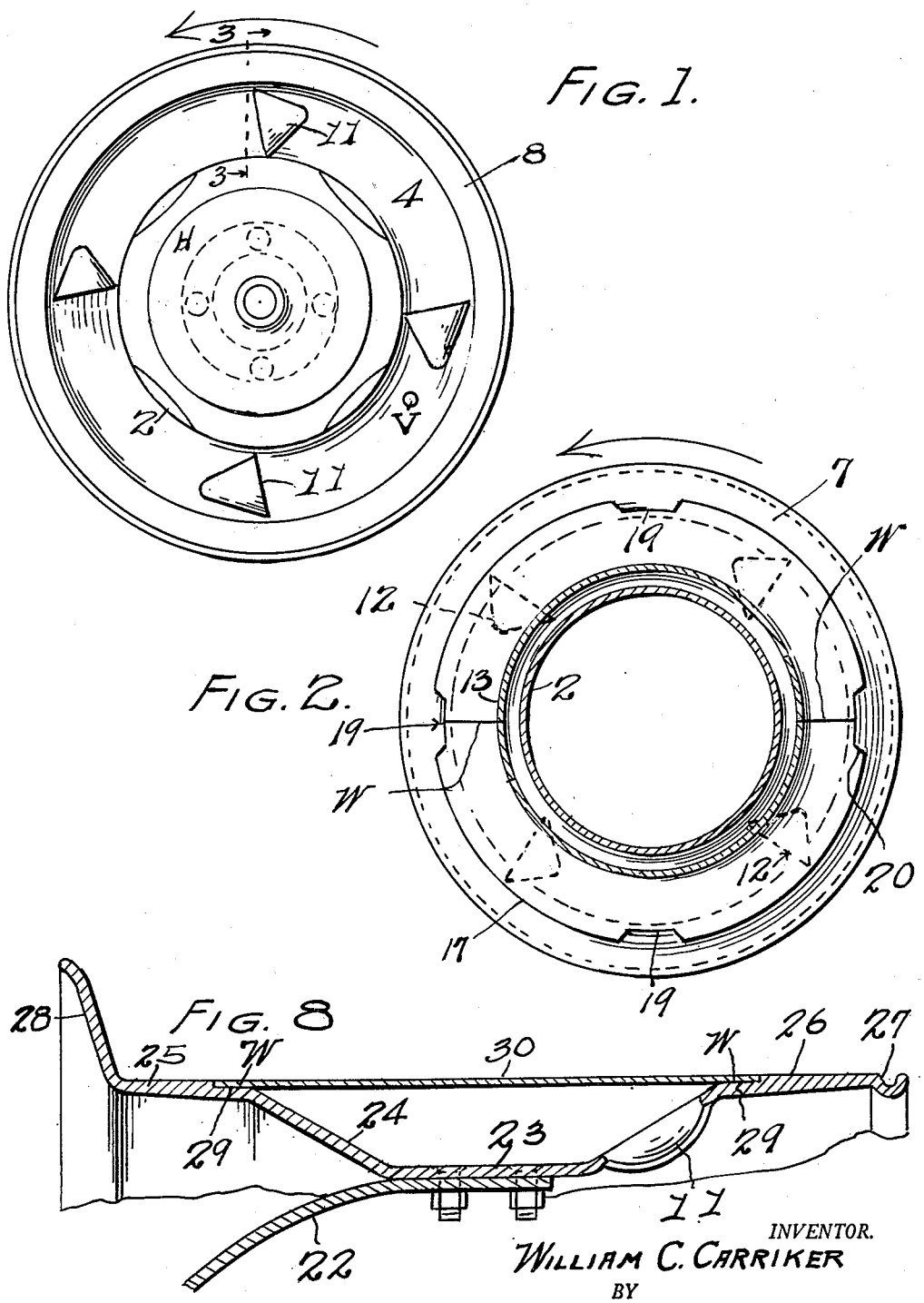
INVENTOR.
WILLIAM C. CARRIKER
BY
Charles K. Davies & Son
Attys.

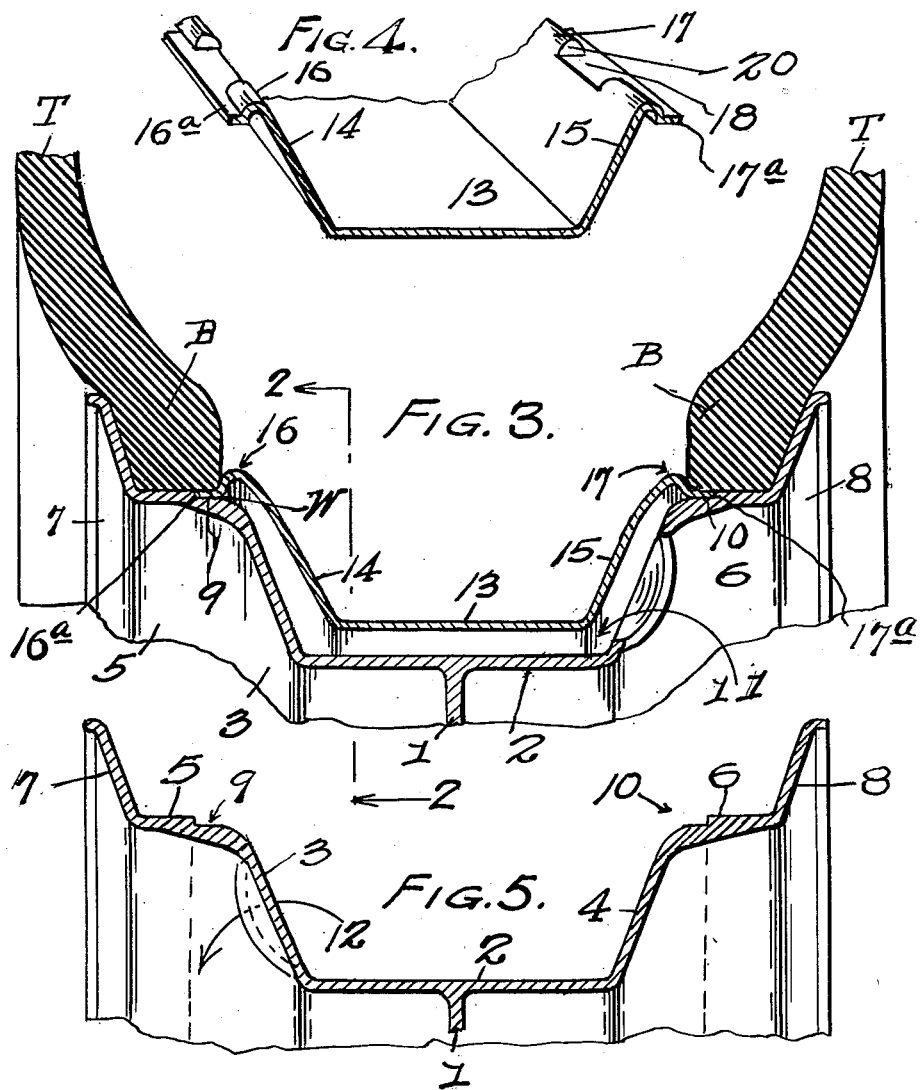

Patented Jan. 9, 1951

2,537,442

UNITED STATES PATENT OFFICE 2,537,442

AIR-COOLED VEHICLE WHEEL

William C. Carriker, South Jacksonville, Fla.

Application December 20, 1948, Serial No. 66,153

5 Claims. (Cl. 152—153)

My present invention relates to the general class of pneumatic wheels for automotive vehicles, and more specifically to an improved air cooled vehicle wheel having a metallic felly which is equipped with a surrounding rim to form a peripheral chamber or interior annular space that is vented at both sides of the wheel to insure circulation of air currents, by centrifugal force, while the wheel is rolling, and thereby convey generated heat from the interior of the tire to the atmosphere. In carrying out my invention the circumferentially spaced surrounding-rim of the felly is provided with safety devices that tend and automatically operate to retain the walls of the pneumatic tire in proper operative position upon the wheel, in the event of tire failure, as the vehicle is being stopped; and the safety devices also facilitate the use of a tire tool in mounting the tire on a wheel as well as in dismounting the tire from the wheel.

The invention includes a minimum number of parts that may may be manufactured with facility and low cost of production, and the parts may be assembled with convenience to insure a wheel structure of this type that is strong and rugged, simple in construction, and efficient in the performance of its required functions.

The invention consists in certain novel features of construction and combinations and arrangements of parts as will hereinafter be described, and more particularly set forth in the appended claims.

In the accompanying drawings I have illustrated a complete example of a physical embodiment of my invention in an automobile wheel, in which the parts are combined and arranged in accord with one mode I have devised for the practical application of the principles of my invention. It will however be understood that changes and alterations are contemplated and may be in these exemplifying drawings and mechanical structures, and in adapting the invention to other types of wheels as indicated by the accompanying modification, all within the scope of my claims, without departing from the principles of the invention.

Figure 1 is a view in elevation looking at the outer side of the felly of a wheel at the left side of a vehicle; and Figure 2 is a longitudinal vertical sectional view of this structure, and as indicated at line 2—2 of Fig. 3.

Figure 3 is an enlarged transverse sectional view through the felly and the rim of the wheel, together with portions of the side walls of the pneumatic tire.

Figure 4 is a detailed transverse sectional view through the saddle or rim of the wheel; and Figure 5 is a similar view through the felly of the wheel.

Figure 6 is a fragmentary plan view showing portions of two of the safety lugs and detent and a portion of projecting side wall 14. Figure 7 is a sectional view through one of the air inlet ports of the felly; and Figure 8 is a transverse detail sectional view through an adaptation of the invention to a truck type of wheel.

In order that the general arrangement and utility of parts may readily be understood I have shown in Figs. 1 and 2 the felly portion of a typical metallic disk wheel as used on the left hand side of an automobile, and including the body or disk 1 with a channel felly 2 having outwardly flared side walls 3 and 4, and flat annular rings or seats 5 and 6 for the beads B of the tire T. At their outer sides the beads B are retained by the annular flanges 7 and 8; and in Fig. 1 a conventional hub cap H and valve stem opening V is indicated.

In adapting the ventilating or cooling system of my invention to this type of wheel the two rings or seats 5 and 6 are fashioned with circumferential open recesses or annular grooves as 9 and 10; and the flaring side walls 3 and 4 are each fashioned with an annular series of ports and cup-shaped scoops or hoods, with intakes for air at the outer side of the wheel, and outlets for air at the inner side of the wheel. The air intakes are indicated at 11, and the air outlets are indicated at 12, and it will be noted that the outer series of intakes are staggered with relation to the inner series of outlets, and that the two series of air ports open in opposite direction on lines tangential to the center of the wheel.

These two series of air ports communicate with an annular interior air chamber, or peripheral cooling space that surrounds the felly and which is located between the felly and the surrounding rim or saddle that supports the inner tube of the pneumatic tire. For this purpose a two-piece rim, which is welded at W, and fashioned of good heat-conducting material or metal, is mounted around the channel portion of the felly, and fashioned with a flat base ring 13 and outwardly flaring side walls 14 and 15 that terminate in annular retaining beads or safety lugs 16 and 17. The rim is spaced from the felly to form the peripheral space or annular air chamber, and the annular beads or safety lugs 16 and 17 which project beyond the seats 5 and 6 of the felly terminate in lateral flanges 16a and 17a which are seated in the annular grooves 9 and 10, to retain the inner edges of the beads B, B of the tire, and the outer edges of the B, B are retained by the flanges 7 and 8 of the felly.

The enclosing rim or saddle is welded to the felly between the projecting edges 16a and 17a of the side walls 14 and 15 and the grooves 9 and 10 of the felly to provide a sealed and water-tight joint for the air chamber with relation to the inner tube.

Two series of circumferentially spaced depressions 18 and 19, pressed or stamped in the bead portions of the side walls 14 and 15, and fashioned with tapered or flaring end walls 20 receive portions of the inflated inner tube of the tire, and thereby eliminate the menace of a pinched tube, and the smooth outer surface of the rim presents a continuous seat for the inner annular portion of the inner tube.

By welding the outer edges 16a and 17a of the depressions 18 and 19 into the grooves 9 and 10 of the felly, a smooth seat or surface is provided at 5 and 6 of the felly for the tire beads B, B; and the series of depressions formed by these safety lugs facilitates mounting and dismounting of the tire, as the end of a tire tool is permitted to pass through the opening made by the depression, to secure better leverage on the bead of the tire.

The number of safety lugs or detents, and the relation of the two series of lugs may be varied as desired; and the number of intake and outlet ports of the felly may also be varied, to provide for the circulation of air currents through the annular air space and for conveying heat from the interior of the tire and the saddle to the atmosphere at the inner side of the wheel.

In Fig. 8 where a modified adaptation of my invention is illustrated in connection with a truck type of wheel, as 22, the felly 23 is provided with flaring side walls 24, one of which is shown equipped with an intake port 11 and the flat seats 25, 26 terminate in a bead 27 having a rim-lock groove at one side and a flared retaining flange 28 at the opposite side of the wheel. Depressions or grooves 29 are provided in the seats 25 and 26 of the felly, and the edges of an annular rim 30 are welded at W to provide the annular air space for venting the interior of the tire.

The various parts of the felly and rim may readily be stamped or pressed into desired shape by means of suitable machines, and the welding of parts may be accomplished with facility by means of usual welding appliances with a minimum expenditure of time and labor.

Having thus fully described my invention, what I claim as new and desire to secure by Letters Patent is:

1. In an air cooled vehicle wheel, the combination with a felly having side walls, a surrounding rim forming an air chamber within the felly, and means for rigidly uniting the rim with the felly, of an annular series of intake ports each having an exterior scoop at one side of the felly, and a relatively staggered series of outlet ports each having an exterior hood at the other side of the felly.

2. In an air cooled vehicle wheel, the combination with a felly having ported side walls, a rim forming an air chamber within the felly, and circumferentially arranged portions of the rim welded to the felly, of an annular series of intake scoops integral with one ported side wall, and a relatively staggered annular series of outlet hoods integral with the other ported side wall of the felly.

3. In an air cooled vehicle wheel, the combination with a felly having an annular series of intake ports at one side and a staggered annular series of outlet ports at its opposite side, and a rim forming an air chamber within the ported felly, of spaced side walls of the rim each terminating in an outstanding retaining bead welded to the felly.

4. In an air cooled vehicle wheel, the combination of a felly having ported side walls, a rim having side walls and forming an air chamber within the felly, the side walls of the rim terminating in integral outstanding retaining beads each having an annular series of depressions, and welded joints between said beads and felly.

5. In an air cooled vehicle wheel, the combination of a felly having ported side walls, a rim having side walls and forming an annular air chamber within the felly, the side walls of the rim terminating in integral outstanding retaining beads each having a lateral flange, a plurality of integral depressions in the beads forming openings therein, said depressions each having flared end walls, and welded joints between said flanges and the felly.

WILLIAM C. CARRIKER.

REFERENCES CITED

The following references are of record in the file of this patent:

UNITED STATES PATENTS

| Number | Name | Date |
|---|---|---|
| 872,860 | Taylor | Dec. 3, 1907 |
| 2,179,656 | Eksergian | Nov. 14, 1939 |
| 2,248,707 | Horn | July 8, 1941 |

FOREIGN PATENTS

| Number | Country | Date |
|---|---|---|
| 222,768 | Great Britain | Oct. 9, 1924 |